(12) United States Patent
Liang et al.

(10) Patent No.: US 11,498,699 B2
(45) Date of Patent: Nov. 15, 2022

(54) SAFETY PROTECTION APPARATUS OF BOARDING BRIDGE WALKING MECHANISM

(71) Applicants: CHINA INTERNATIONAL MARINE CONTAINERS (GROUP) LTD., Guangdong (CN); SHENZHEN CIMC-TIANDA AIRPORT SUPPORT LTD, Guangdong (CN)

(72) Inventors: Lexian Liang, Guangdong (CN); Wei Xiang, Guangdong (CN); Jianming Huang, Guangdong (CN); Shaobo Hu, Guangdong (CN)

(73) Assignees: CHINA INTERNATIONAL MARINE CONTAINERS (GROUP) LTD., Guangdong (CN); SHENZHEN CIMC-TIANDA AIRPORT SUPPORT LTD., Guangdong (CN)

( * ) Notice: Subject to any disclaimer, the term of this patent is extended or adjusted under 35 U.S.C. 154(b) by 550 days.

(21) Appl. No.: 16/608,256

(22) PCT Filed: Apr. 25, 2018

(86) PCT No.: PCT/CN2018/084479
§ 371 (c)(1),
(2) Date: Oct. 25, 2019

(87) PCT Pub. No.: WO2018/196789
PCT Pub. Date: Nov. 1, 2018

(65) Prior Publication Data
US 2020/0189768 A1    Jun. 18, 2020

(30) Foreign Application Priority Data
Apr. 27, 2017  (CN) .......................... 201710288419.5

(51) Int. Cl.
*B64F 1/31*  (2006.01)
*E01D 15/12*  (2006.01)
(Continued)

(52) U.S. Cl.
CPC .............. *B64F 1/31* (2013.01); *B65G 69/287* (2013.01); *B65G 69/30* (2013.01); *E01D 15/127* (2013.01); *B65G 69/2876* (2013.01)

(58) Field of Classification Search
CPC .......... B64F 1/31; B64F 1/305; B64F 1/3055; B65G 69/287; B65G 69/30;
(Continued)

(56) References Cited

U.S. PATENT DOCUMENTS 5,524,318 A  6/1996 Thomas
6,691,361 B2 2/2004 Rolfe
(Continued)

FOREIGN PATENT DOCUMENTS

CN    2883177 Y    3/2007
CN    101723094 A    6/2010
(Continued)

OTHER PUBLICATIONS

Communication Supplementary European Search Report dated Dec. 22, 2020 in connection with European Patent Application No. 18791258.9.
(Continued)

*Primary Examiner* — Abigail A Risic
(74) *Attorney, Agent, or Firm* — Amster, Rothstein & Ebenstein LLP (57) ABSTRACT

A boarding bridge walking mechanism with a safety protection apparatus, the safety protection apparatus includes an inner retainer mechanism, an outer retainer mechanism, a connecting mechanism and an induction and control mechanism. The inner retainer mechanism includes an inner
(Continued)

bracket and a first universal wheel. The outer retainer mechanism includes an outer bracket. The outer bracket is disposed on the outer circumference of the inner bracket, and a lower end of the outer bracket is lower than a lower end of the inner bracket. The connecting mechanism includes a first connecting component. The first connecting component is connected between the inner bracket and the outer bracket, such that the inner bracket is hinged with the outer bracket. The induction and control mechanism includes an induction unit.

10 Claims, 9 Drawing Sheets

(51) Int. Cl.
    *B65G 69/28* (2006.01)
    *B65G 69/30* (2006.01)
    *E01D 15/127* (2006.01)

(58) Field of Classification Search
    CPC ............ B65G 69/2876; B65G 69/2882; B65G 69/2888; B65G 69/2894; E01D 15/22; E01D 15/12
    See application file for complete search history.

(56) References Cited

U.S. PATENT DOCUMENTS

| | | | | |
|---|---|---|---|---|
| 6,837,296 | B2 * | 1/2005 | Kimener | ................. E06B 11/00 160/113 |
| 8,875,440 | B1 * | 11/2014 | Duran | ................. B65G 69/2888 49/34 |
| 10,457,506 | B1 * | 10/2019 | Bennett | ............. B65G 69/2876 |

FOREIGN PATENT DOCUMENTS

| | | |
|---|---|---|
| CN | 202295333 U | 7/2012 |
| CN | 202379092 U | 8/2012 |
| CN | 102991688 A | 3/2013 |
| CN | 103144777 A | 6/2013 |
| CN | 203020549 U | 6/2013 |
| CN | 205396575 U | 7/2016 |
| CN | 106379553 A | 2/2017 |
| CN | 106394926 A | 2/2017 |
| EP | 0302709 A1 | 2/1989 |
| KR | 101156500 B1 | 6/2012 |

OTHER PUBLICATIONS

Notice of Allowance dated Nov. 23, 2020 in connection with Chinese Patent Application No. 201710288419.5.

* cited by examiner

SAFETY PROTECTION APPARATUS OF BOARDING BRIDGE WALKING MECHANISM

CROSS REFERENCE

The present disclosure claims the priority to Chinese patent application NO. 201710288419.5, filed on Apr. 27, 2017, which is incorporated herein by reference in its entirety.

TECHNICAL FIELD

The present disclosure relates to a boarding bridge walking mechanism, and particularly, relates to a safety protection apparatus of the boarding bridge walking mechanism.

BACKGROUND

During the walking process of the boarding bridge, the airport ground staff or equipment cannot be effectively protected, which is likely to cause casualties or equipment property losses, and there are potential safety hazards. Therefore, more and more airport customers begin to require the configuration of walking safety protection apparatus.

Since the MH/T6028-2003 passenger boarding bridge industry standard does not put forwards clear requirements for the safety protection apparatus of the wheeled boarding bridge walking mechanism, at present, most of the domestic airport boarding bridges are not equipped with walking safety protection apparatus, or only walking retainer with single layer structure is used. The distance of the retainer from the ground is about 600 mm, and the retainer is directly mounted on the walking wheel frame. When the boarding bridge is tilted, the height of the retainer from the ground changes accordingly, and there is a risk of person falling easily. The requirements of the new national standard for safety protection apparatus cannot be satisfied.

For example, a patent application NO. 201210389214.3 discloses a safety protection apparatus of a boarding bridge walking mechanism. The safety protection apparatus thereof is connected with the walking wheel frame, therefore the distance of the safety protection apparatus from the ground may change due to the pitch of the boarding bridge, and there may be the danger of people falling because of the too large distance of the safety protection apparatus from the ground.

In another patent application No. 201120407975.8, a boarding bridge walking retainer is disclosed, which is provided with a pressure induction rubber on the outer side of the retainer. Since the pressure induction rubber specification belongs to a standardized product that has already been produced, the buffering distance cannot be changed. When a person hits the walking retainer, the buffering time of the pressure induction rubber may not be sufficient for the reaction time of the bridge to stop moving, and there is a risk of hitting people down.

Therefore, there is a need to improve existing safety protection apparatus to solve the above mentioned problems.

The above mentioned information disclosed in the background section is only for enhancing the understanding of the present disclosure background, and thereby it may include information that does not constitute prior art known to those skilled in the art.

SUMMARY

The present disclosure provides a safety protection apparatus of a boarding bridge walking mechanism, which is used for connecting with a boarding bridge walking mechanism. The safety protection apparatus includes an inner retainer mechanism, an outer retainer mechanism, a connecting mechanism and an induction and control mechanism.

The inner retainer mechanism includes an inner bracket and a first universal wheel. The inner bracket surrounds the boarding bridge walking mechanism and is hinged with the boarding bridge walking mechanism. The first universal wheel is disposed at one side of the inner bracket and supports the inner bracket. The outer retainer mechanism includes an outer bracket. The outer bracket is disposed on the outer circumference of the inner bracket, and a lower end of the outer bracket is lower than the lower end of the inner bracket. The connecting mechanism includes a first connecting component, and the first connecting component is connected between the inner bracket and the outer bracket, such that the inner bracket is hinged with the outer bracket. The induction and control mechanism includes an induction unit.

In an embodiment, when the boarding bridge walking mechanism is tilted, the boarding bridge walking mechanism rotates relative to the inner bracket, and the inner bracket does not rotate with the boarding bridge walking mechanism. When the outer bracket is squeezed, the outer bracket approaches the inner bracket, so that the induction unit is triggered.

BRIEF DESCRIPTION OF THE DRAWINGS

The various objects, characteristics and advantages of the present disclosure will become more apparent by considering the following detailed description of preferred embodiments of the present disclosure in combination with the accompanying drawings. The accompanying drawings are merely illustrative of the present disclosure and are not necessarily drawn to scale. In the accompanying drawings, the same reference numerals of the accompanying drawings always denote the same or similar component. In which.

DETAILED DESCRIPTION

Example embodiments will now be described more fully with reference to the accompanying drawings. However, the example embodiments can be embodied in many forms, and should not be understood as being limited to the embodiments set forth herein. On the contrary, these embodiments are provided so that the present disclosure will be comprehensive and integrated, and the concept of the example embodiments is fully conveyed to those skilled in the art. The same reference numerals of the accompanying drawings denote the same or similar structures, thus their detailed description will be omitted.

Relative terms such as "lower" or "bottom" and "higher" or "top" may be used in the embodiments to describe the relative relationship of one component to another component marked in the drawings. It can be understood that if the apparatus marked in the drawings is flipped upside down, the described component at the "lower" side will become the component at the "higher" side. In addition, when a layer is "on" the other layer or substrate, it may mean "directly" on the other layer or substrate, or mean a layer is on the other layer or substrate, or mean that a layer is sandwiched between the other layer or substrate.

Figure 1:
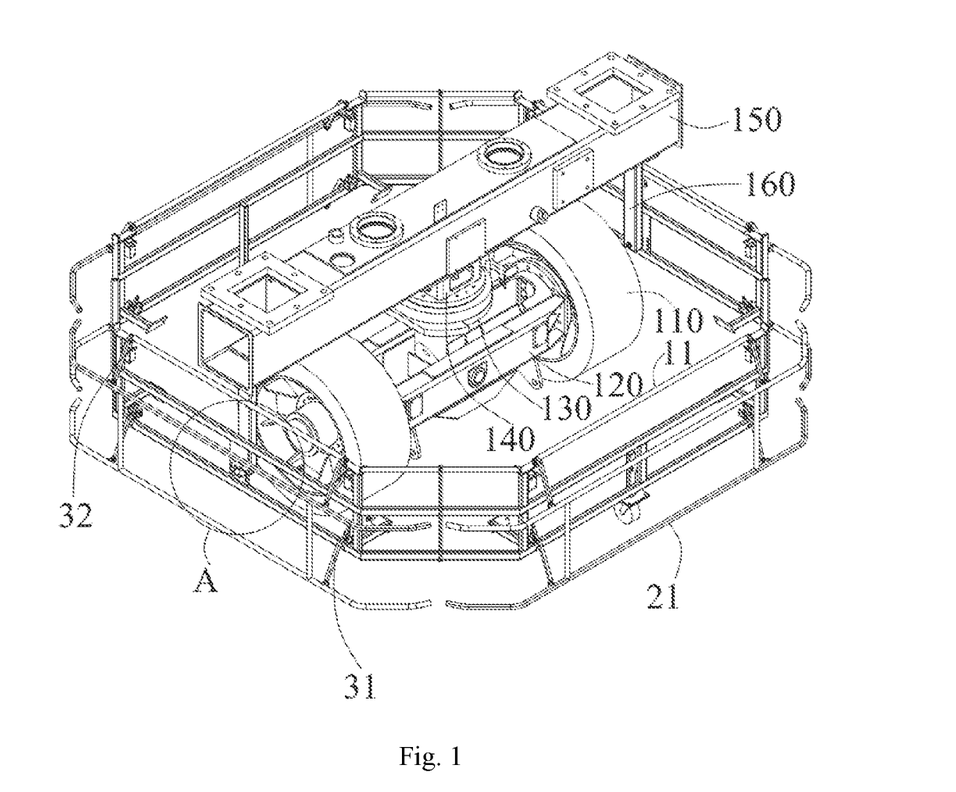
FIG. 1 is the perspective view of the safety protection apparatus of the boarding bridge walking mechanism of the present disclosure.
Figure 2:
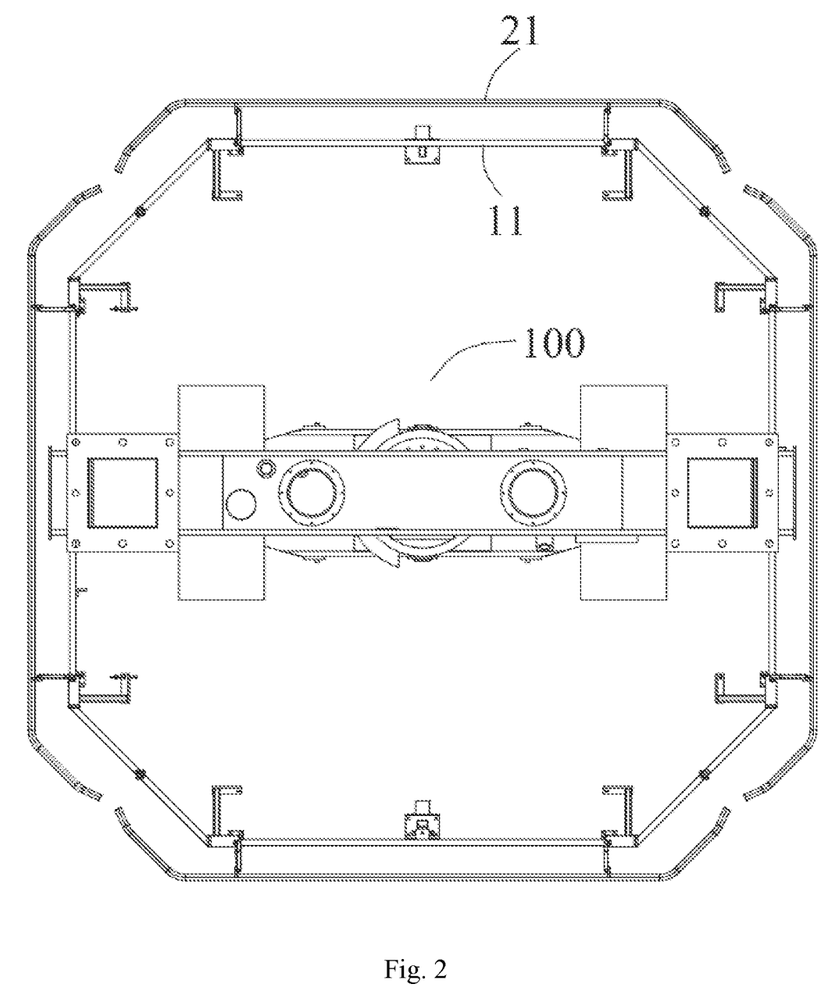
FIG. 2 is the top view of the safety protection apparatus of the boarding bridge walking mechanism of the present disclosure.
Figure 3:
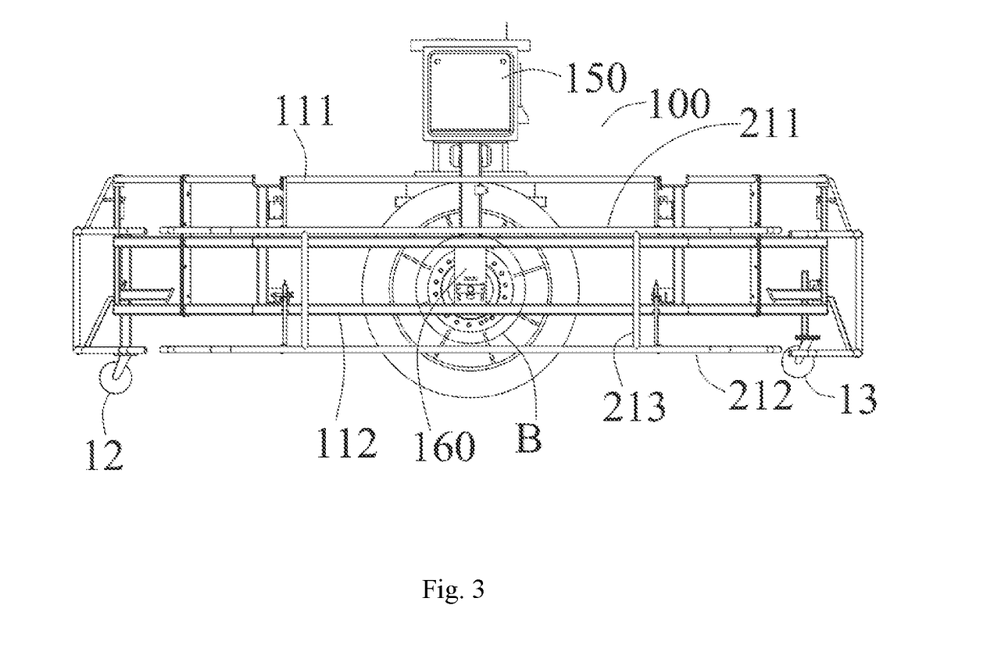
FIG. 3 is the side view of the safety protection apparatus of the boarding bridge walking mechanism of the present disclosure.
Figure 4:
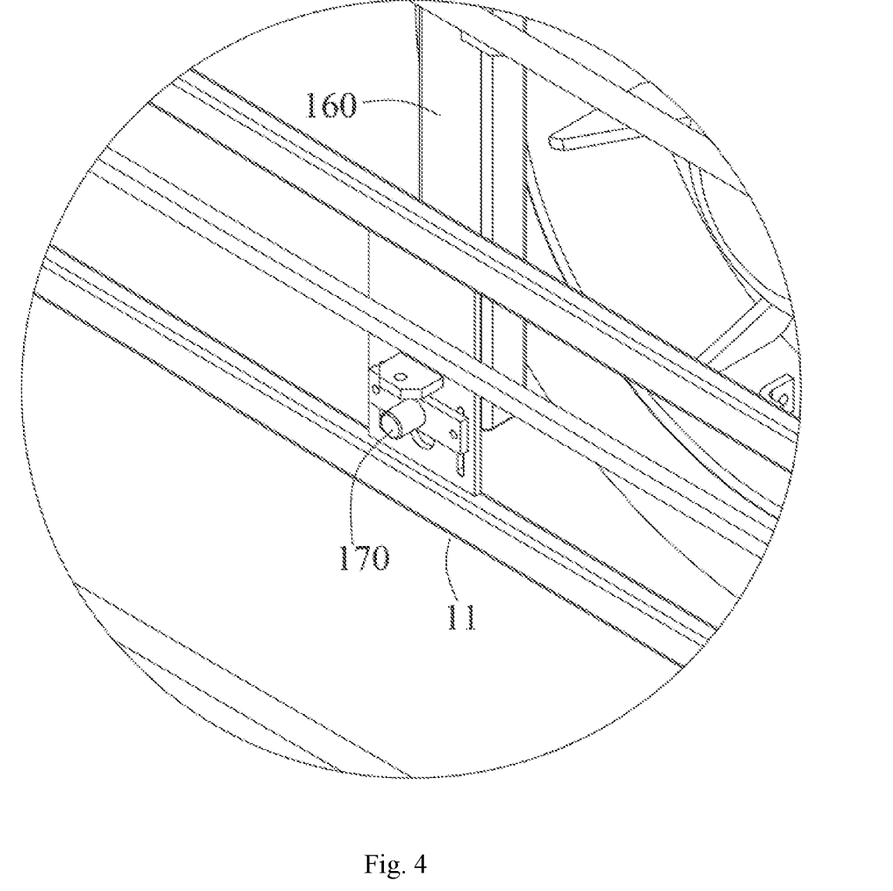
FIG. 4 is the partially enlarged view of the part A in FIG. 1.
Figure 5:
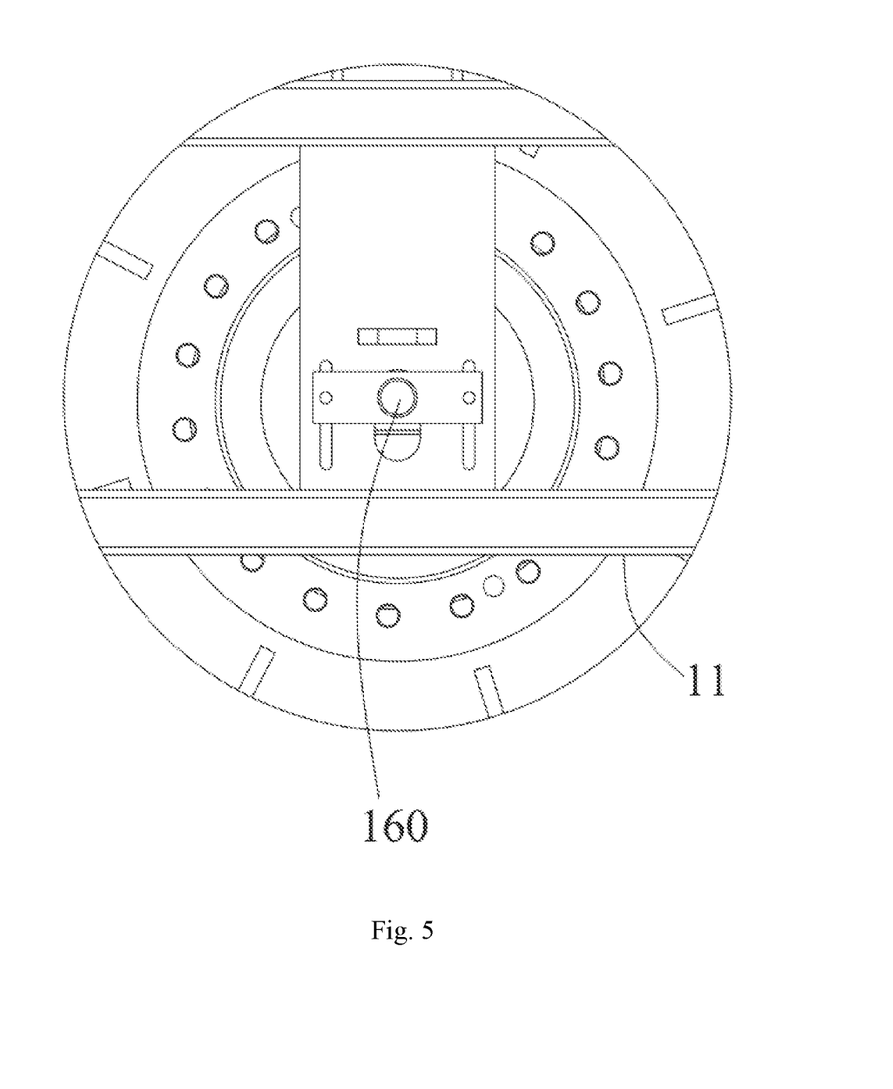
FIG. 5 is the partially enlarged view of the part B in FIG. 3.

The present disclosure provides a safety protection apparatus of a boarding bridge walking mechanism, the safety protection apparatus is used for connecting with the boarding bridge walking mechanism 100. As shown in FIG. 1 to FIG. 3, the safety protection apparatus includes an inner retainer mechanism, an outer retainer mechanism, a connecting mechanism and an induction and control mechanism.

The inner retainer mechanism includes an inner bracket 11 and a first universal wheel 12. The inner bracket 11 surrounds the boarding bridge walking mechanism 100 and is hinged with the boarding bridge walking mechanism 100. The first universal wheel 12 is disposed at one side of the inner bracket 11 and supports the inner bracket 11. The outer retainer mechanism includes an outer bracket 21. The outer bracket 21 is disposed on the outer circumference of the inner bracket 11, and a lower end of the outer bracket 21 is lower than the lower end of the inner bracket 11. The connecting mechanism includes a first connecting component 31, and the first connecting component is connected between the inner bracket 11 and the outer bracket 21, such that the inner bracket 11 is hinged with the outer bracket 21. The induction and control mechanism includes an induction unit 41.

In an embodiment, when the boarding bridge walking mechanism 100 is tilted, the boarding bridge walking mechanism 100 rotates relative to the inner bracket 11, and the inner bracket 11 does not rotate with the boarding bridge walking mechanism 100. When the outer bracket 21 is squeezed, the outer bracket 21 approaches towards the inner bracket 11, so that the induction unit 41 is triggered.

Therefore, when the boarding bridge walking mechanism is pitched, the boarding bridge walking mechanism can rotate relative to the inner bracket, and the safety protection continues to maintain the original state and does not follow the boarding bridge walking mechanism to rotate, thereby ensuring that the inner retainer mechanism is not affected by the pitching of boarding bridge walking mechanism, insuring the stability of the safety protection apparatus, ensuring that the distance between the safety protection apparatus and the ground remains unchanged, and avoiding the danger existence of personnel falling because of the too large distance of the safety protection apparatus from the ground.

Moreover, the outside of the inner bracket is further provided with an outer bracket, and the inner bracket and the outer bracket are hinged by a connecting mechanism. The induction unit is triggered when an object or person squeezes the outer bracket. The outer bracket and the connecting mechanism provide a larger cushioning stroke, which effectively reduces damage to people and object during the movement of the walking mechanism.

In the present embodiment, as shown in FIG. 1 to FIG. 3, the boarding bridge walking mechanism 100 includes a driving apparatus, walking wheels 110, a walking wheel frame 120, a vertical shaft 130, a slewing support 140, an upper beam 150, a hanging bracket 160 and a walking control system. The driving apparatus is preferably electric motor driver, which provides power for the front, back, left and right movements of the walking mechanism. The walking wheel 110 is mounted on two ends of the walking wheel frame 120, and the walking wheel frame 120 is hinged with the vertical shaft 130. The vertical shaft 130 is connected with the upper beam 150 through the slewing support 140. A hanging bracket 160 is disposed below each end of the upper beam 150, and a certain distance exists between the hanging bracket 160 and the walking wheel 110. The two ends of the upper beam 150 are connected with the inner bracket 11 through the hanging bracket 160, respectively. The hanging bracket 160 and the inner bracket 11 are connected by a hinge pin 170, and the axis of the hinge pin 170 passes through the axis of the walking wheel 110. When the boarding bridge walking mechanism 100 is tilted, the hanging bracket 160 can be rotatable around the hinge pin 170. The walking control system is a PLC controller, which is used for controlling the walking and stopping of the walking mechanism.

Figure 7:
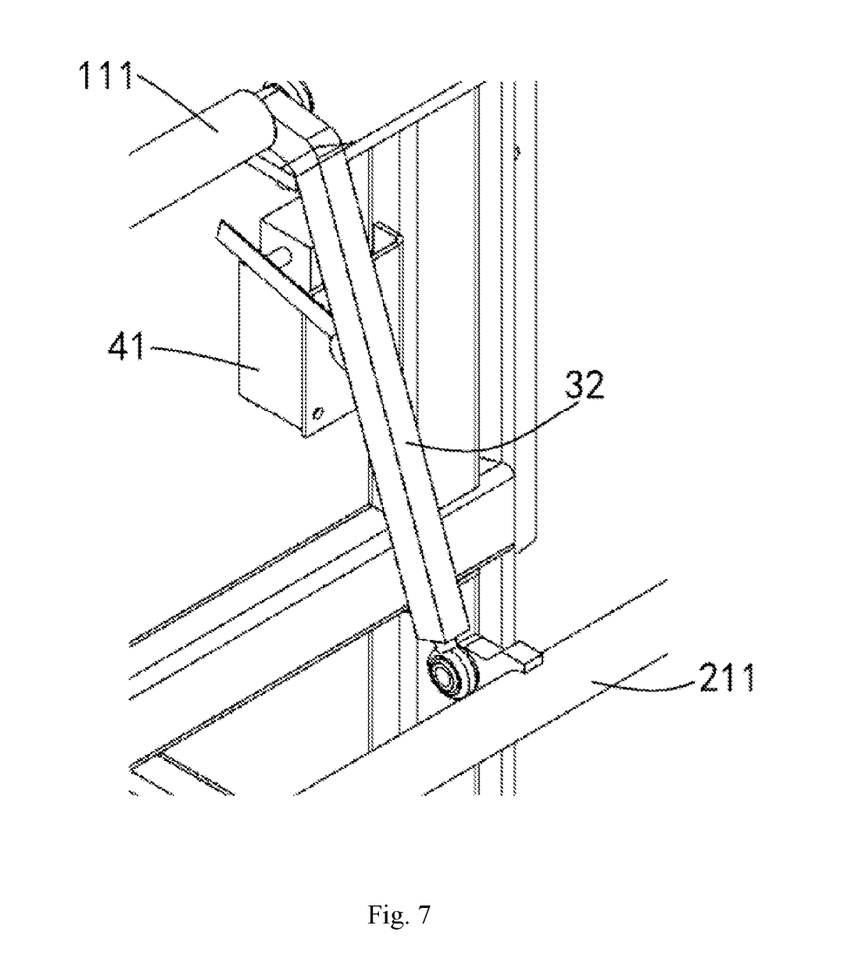
FIG. 7 is the partially enlarged view of the induction unit.
Figure 8:
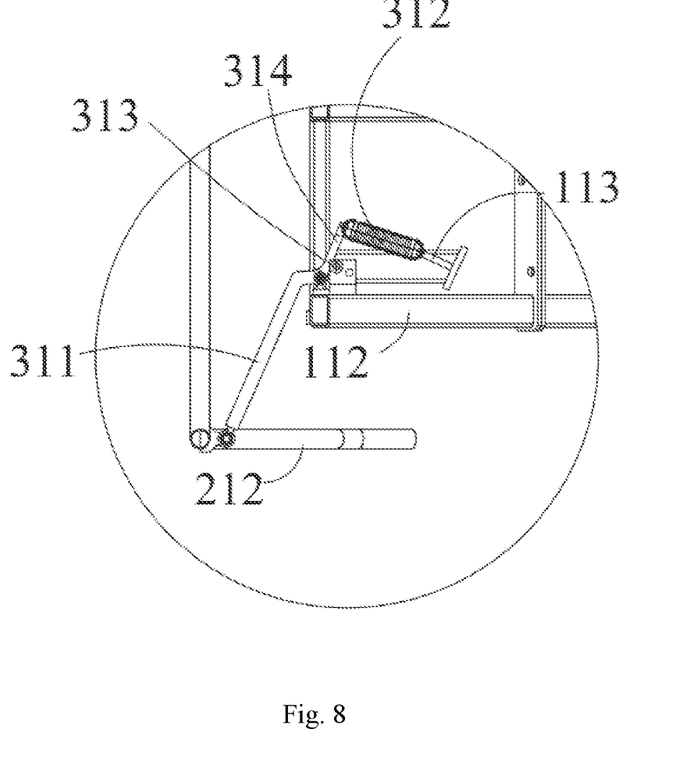
FIG. 8 is the partially enlarged view of the first connecting component.
Figure 9:
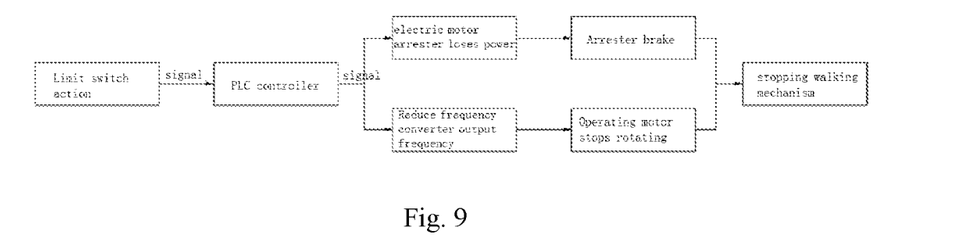
FIG. 9 is a control flow chart of the induction and control mechanism.
Figure 10:
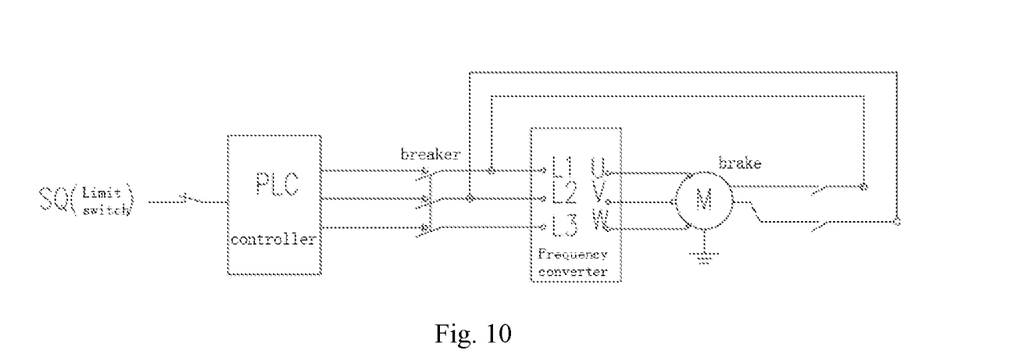
FIG. 10 is a control schematic diagram of the induction and control mechanism.

In the present embodiment, as shown in FIG. 7 to FIG. 9, the induction unit 41 can be a limit switch, and the induction and control mechanism further includes a PLC control system. When the outer bracket 21 is impacted or squeezed by an object, the limit switch connected between the outer bracket 21 and the inner bracket 11 is triggered, and a signal is transmitted to the PLC controller. The PLC controller receives the signal, and controls the electric motor arrester brake to lose power, and the arrester brake carries out braking. At the same time, the output frequency of the frequency converter lowers, and the driving electric motor that drives the walking mechanism of the boarding bridge walking mechanism 100 stops rotating, thereby stopping the walking mechanism.

In the present embodiment, as shown in FIG. 1 and FIG. 2, the inner bracket 11 is a circumferential continuous frame, and the number of the outer brackets 21 is four. It should be understood that the number of the outer brackets 21 is not limited thereto, and may change correspondingly according to the shape and application requirements of the product. For example, the number of the outer bracket can be two, when the outer retainer mechanism is designed to be arc-shaped; the number of the outer bracket can be three, when the outer retainer mechanism is designed to be a triangular. In the present embodiment, four outer brackets 21 are connected with the periphery of the inner bracket 11, respectively. The four sides of the inner bracket 11 can be straight edges. At four corners of the inner bracket 11, the two adjacent straight edges can be connected by a hypotenuse. Two ends of the outer bracket 21 may be arc-shaped, that is, the four corners of the inner bracket 11 are surrounded as much as possible, and the distance between the adjacent outer brackets 21 is smaller, thereby achieving overall protection.

Figure 6:
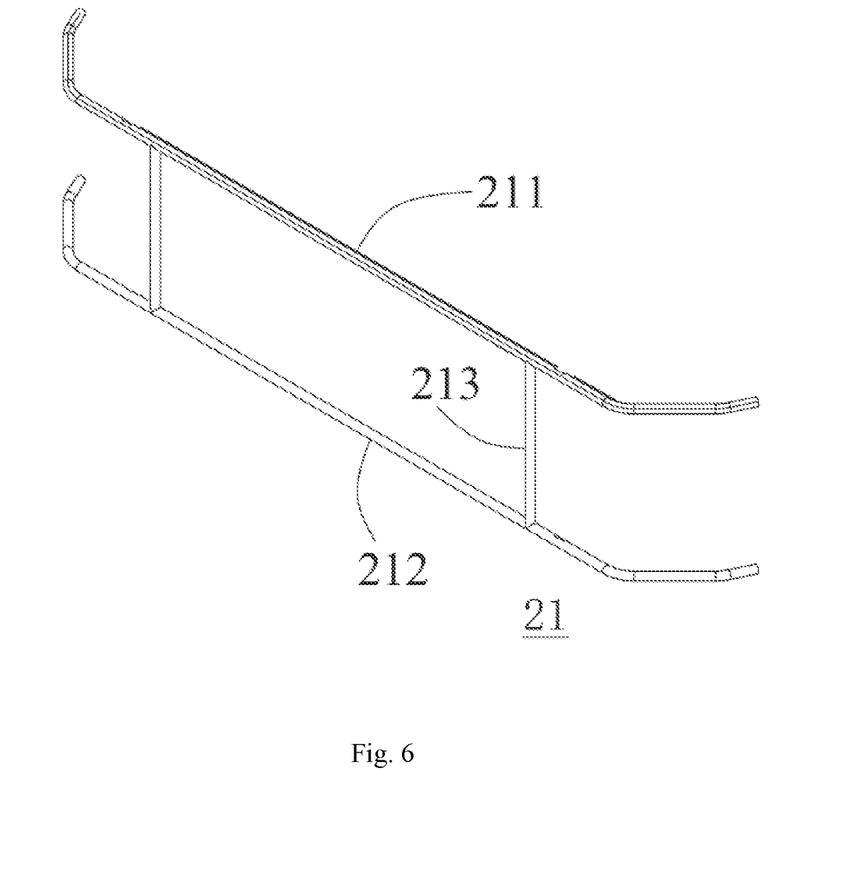
FIG. 6 is the perspective view of the outer bracket.

In the present embodiment, as shown in FIG. 1, FIG. 3 and FIG. 6, the inner bracket 11 includes a first upper rod 111 and a first lower rod 112. The outer bracket 21 includes a second upper rod 211, a second lower rod 212 and a connecting rod 213 connected between the second upper rod 211 and the second lower rod 212. The first lower rod 112 and the second lower rod 212 are hinged by a first connecting component 31.

In the present embodiment, the outer bracket 21 is formed a closed fence around the inner bracket 11. Since the inner and outer brackets are hinging connected with each other, the shaking of other bars will be triggered when person or object in any movement direction impacts and squeezes any rod of the outer bracket 21. Moreover, the outer bracket 21 is divided into two layers of upper and lower. Compared with the single layer induction of the related art, the present embodiment can simultaneously induce objects or people at lower and higher positions, thereby the objects can be induced in all directions. The walking mechanism can be controlled to automatically stop after the object is detected, thereby effectively ensuring the personnel safety.

In the present embodiment, as shown in FIG. 8, the first connecting component 31 includes a connecting rod 311, a spring 312 and a stop shaft 313. One end of the connecting rod 311 is hinged with the first lower rod 112, and the other end of the connecting rod 311 is hinged with the second lower rod 212. One end of the spring 312 is connected with the inner bracket 11, and the other end of the spring 312 is connected with the connecting rod 311. The spring 312 provides a pulling force to the connecting rod 311. The stop shaft 313 is removably disposed on the first lower rod 112, and is close to the connecting rod 311 to prevent the connecting rod 311 from moving upward. In an embodiment, the inner bracket 11 can provide with a first extending portion 113, and the connecting rod 311 can provide with a second extending portion 314. One end of the spring 312 is connected with the first extending portion 113, and the other end of the spring 312 is connected with the second extending portion 314.

Under the pulling force of the spring 312, the outer bracket 21 can be prevented from sagging due to its own weight. At the same time, under the stop action of the stop shaft 313, the outer bracket 21 is prevented from moving up due to the pulling force of the spring 312. Therefore, under the combined action of the pulling force of the spring 312 and the stop of the stop shaft 313, the outer bracket 21 and the connecting rod 311 can be stably maintained in a normal position without waggling up and down.

In an embodiment, according to the structure arrangement of the present embodiment, the height of the first upper rod 111 from the ground is greater than 1 m. Moreover, in any state of the boarding bridge, the distance of the second lower rod 212 from the ground is no more than 200 mm. The distance between the safety protection apparatus and the walking wheel 110 can also always be greater than 200 mm. That is, it fully meets the distance requirements of the new version of MH/T6028-2016, civil aviation industry standard of the People's Republic of China.

In the present embodiment, the outer bracket 21 can be moved up and down by the first connecting component 31 of the outer bracket 21 and the inner bracket 11, thereby appropriately adjusting the distance of the safety protection apparatus from the ground, and therefore also facilitating the emergency back bridge operation of the walking mechanism. In the present embodiment, when the stop shaft 313 is removed from the first lower rod 112, the connecting rod 311 is rotated upward under the action of the pulling force of the spring 312 and the external force, such that the outer bracket 21 moves upward to conduct emergency back bridge operation. Details are as follows.

Under normal situations, the stop shaft 313 stops the connecting rod 311, so that the connecting rod 311 is tilted downward. At this time, the outer bracket 21 is at a lower position, that is, the distance from the ground is no more than 200 mm. When an emergency situation occurs and a back bridge operation is required, the mop of the emergency back bridge apparatus should pass through the safety protection apparatus and connect the bottom of the walking wheel frame 120. However, since distance of the bottom of the safety protection apparatus from the ground is no more than 200 mm, such that the outer bracket 21 is too close to the ground, the mop of the emergency back bridge apparatus may not be able to connect with the bottom of the walking wheel frame 120. At this time, it only needs to remove the stop shaft 313. The connecting rod 311 loses the stop action of the stop shaft 313. Under the action of the pulling force of the spring 312 and the external force, the connecting rod 311 rotates upward, that is, rotating in clockwise direction in FIG. 8, such that the outer bracket 21 is moved up as a whole, and the distance between the outer bracket 21 and the ground increases, the mop of the emergency back bridge apparatus is smoothly connected with the bottom of the walking wheel frame 120, and the back bridge operation is performed to ensure safety.

In the present embodiment, the length of the connecting rod 311 can be flexibly designed. For example, the length of the connecting rod 311 can be appropriately increased to expand the cushioning stroke of the safety protection apparatus. When an object or a person impacts the outer bracket 21, the object or the person squeezes the outer bracket 21. When the squeezing distance is within the length scope of the connecting rod 311, the boarding bridge walking mechanism 100 does not cause damage to the object or person. At the same time, a longer cushioning stroke is also advantageous in ensuring that no damage is caused to the object or person during the normal reaction time of the boarding bridge walking mechanism 100 from movement to stop.

In the present embodiment, as shown in FIG. 1 and FIG. 7, the connecting mechanism further includes a second connecting component 32. One end of the second connecting component 32 is hinged with the first upper rod 111, and the other end of the second connecting component 32 is hinged with the second upper rod 211. The second connecting component 32 is mainly used for achieving the hinge, and does not have to have the functions of pulling up, stopping, etc. as the first connecting component 31.

In the present embodiment, two first connecting components 31 are disposed between each first lower rod 112 and each second lower rod 212. Two second connecting components 32 are disposed between each first upper rod 111 and each second upper rod 211.

However, the number and position of the first connecting component 31 and the second connecting component 32 are only diagrammatic drawing. The number may be increased or decreased or the position may be changed according to actual conditions, and such changes all belong to the protection scope of the present disclosure.

In the present embodiment, as shown in FIG. 3, the inner retainer mechanism further includes a second universal wheel 13, which is disposed on a side of the inner bracket 11 opposite to the first universal wheel 12, and the second universal wheel 13 is higher than the first universal wheel 12. When the connecting rod 311 is maintained in the normal position, the second universal wheel 13 does not contact the ground. When the safety protection apparatus is under downward pressure, the second universal wheel 13 is supported on the ground. Thereby, the safety protection apparatus is prevented from contacting with the ground under the squeezing action of the external force, and prevented from causing damage to the ground and the safety protection apparatus.

In conclusion, when the boarding bridge walking mechanism is pitched, the boarding bridge walking mechanism can rotate relative to the inner bracket, while the safety protection apparatus continues to remain in the original state and does not follow the boarding bridge walking mechanism to rotate, thereby ensuring that the inner retainer mechanism is not affected by the pitching of the boarding bridge walking mechanism, insuring the stability of the safety protection apparatus, ensuring that the distance between the safety protection apparatus and the ground remains unchanged, and avoiding the existence of person falling danger due to the too large distance of the safety protection apparatus from the ground.

Moreover, the outside of the inner bracket is further provided with an outer bracket, and the inner bracket and the outer bracket are hinged by a connecting mechanism. The induction unit is triggered when an object or a person squeezes the outer bracket. The outer bracket and the connecting mechanism provide a larger cushioning stroke, which effectively reduces the damage to people and object during the movement of the walking mechanism.

Although the present disclosure has been described with reference to several typical embodiments, it should be understood that the used terms are illustrative and exemplary rather than restrictive. Since the present disclosure can be embodied in various forms without departing from the spirit or essence of the disclosure, it should be understood that the above described embodiments are not limited to any foregoing details, but should be explained broadly within the spirit and scope defined by the appended claims. Therefore, all changes and modifications that fall within the scope of the claims and equivalents thereof should be covered by the appended claims.

What is claimed is:

1. Boarding bridge walking mechanism with a safety protection apparatus, the safety protection apparatus comprising:
    an inner retainer mechanism, comprising an inner bracket and a first universal wheel, the inner bracket surrounding the boarding bridge walking mechanism and being hinged with the boarding bridge walking mechanism, and the first universal wheel being disposed at one side of the inner bracket and supporting the inner bracket;
    an outer retainer mechanism, comprising an outer bracket, the outer bracket being disposed on an outer circumference of the inner bracket, and a lower end of the outer bracket being lower than a lower end of the inner bracket;
    a connecting mechanism, comprising a first connecting component, and the first connecting component being connected between the inner bracket and the outer bracket, such that the inner bracket being hinged with the outer bracket; and
    an induction and control mechanism, comprising an induction unit;
    wherein when the boarding bridge walking mechanism is tilted, the boarding bridge walking mechanism rotates relative to the inner bracket, and the inner bracket does not follow the boarding bridge walking mechanism to rotate; when the outer bracket is squeezed, the outer bracket approaches the inner bracket, so that the induction unit is triggered.

2. The boarding bridge walking mechanism of claim 1, wherein the inner bracket is a circumferential continuous frame, the number of the outer brackets are plural, and the plurality of outer brackets are connected around the inner brackets.

3. The boarding bridge walking mechanism of claim 2, the inner bracket comprising a first upper rod and a first lower rod, the outer bracket comprising a second upper rod, a second lower rod and a connecting rod connected between the second upper rod and the second lower rod, and the first lower rod and the second lower rod being hinged through the first connecting component.

4. The boarding bridge walking mechanism of claim 3, the first connecting component comprising a connecting rod, a spring and a stop shaft; one end of the connecting rod being hinged with the first lower rod, and the other end of the connecting rod being hinged with the second lower rod; one end of the spring being connected with the inner bracket, the other end of the spring being connected with the connecting rod, and the spring providing a pulling force to the connecting rod; the stop shaft being removably disposed on the first lower rod, and being close to the connecting rod to prevent the connecting rod from moving upward; through the pulling force provided by the spring to the connecting rod and the stop of the stop shaft, the connecting rod being maintained in a normal position.

5. The boarding bridge walking mechanism of claim 4, wherein when the connecting rod is maintained in the normal position, the distance of the second lower rod from the ground is less than or equal to 200 mm; when the stop shaft is removed from the first lower rod, the connecting rod is rotated upward under the action of the pulling force of the spring, such that the outer bracket moves upward.

6. The boarding bridge walking mechanism of claim 4, the connecting mechanism further comprising a second connecting component, one end of the second connecting component being hinged with the first upper rod, and the other end of the second connecting component being hinged with the second upper rod.

7. The boarding bridge walking mechanism of claim 6, two first connecting components being disposed between each first lower rod and each second lower rod, and two second connecting components being disposed between each first upper rod and each second upper rod.

8. The boarding bridge walking mechanism of claim 1, the inner retainer mechanism further comprising a second universal wheel, the second universal wheel being disposed on a side of the inner bracket opposite to the first universal wheel, and the second universal wheel being higher than the first universal wheel;
    wherein when the connecting rod is maintained in a normal position, the second universal wheel does not contact the ground; when the safety protection apparatus is under downward pressure, the second universal wheel supports on the ground.

9. The boarding bridge walking mechanism of claim 1, the boarding bridge walking mechanism comprising a walking wheel, an upper beam and a hanging bracket; the walking wheel being on the ground, and the upper beam being connected with the walking wheel; two ends of the upper beam being respectively connected with the inner bracket through the hanging bracket, and the hanging bracket being connected with the inner bracket through a hinge pin; the axis of the hinge pin passing through the axis of the walking wheel;
    wherein when the boarding bridge walking mechanism is tilted, the hanging bracket can rotate around the hinge pin.

10. The boarding bridge walking mechanism of claim 1, the induction unit is a limit switch, the induction and control mechanism further comprises a PLC control system; when the limit switch is triggered, a signal is transmitted to the PLC controller through the limit switch, and the PLC control system controls the boarding bridge walking mechanism to stop operating.

\* \* \* \* \*

UNITED STATES PATENT AND TRADEMARK OFFICE
CERTIFICATE OF CORRECTION

PATENT NO. : 11,498,699 B2  
APPLICATION NO. : 16/608256  
DATED : November 15, 2022  
INVENTOR(S) : Lexian Liang et al.

Page 1 of 1

It is certified that error appears in the above-identified patent and that said Letters Patent is hereby corrected as shown below:

On the Title Page

Item (73) change, "CHINA INTERNATIONAL MARINE CONTAINERS (GROUP) LTD., Guangdong (CN); SHENZHEN CIMC-TIANDA AIRPORT SUPPORT LTD., Guangdong (CN)" to -- SHENZHEN CIMC-TIANDA AIRPORT SUPPORT LTD., Shenzhen, (CN) --

Signed and Sealed this  
Sixth Day of June, 2023

Katherine Kelly Vidal  
*Director of the United States Patent and Trademark Office*